(12) United States Patent
Bhanage et al.

(10) Patent No.: US 10,911,279 B2
(45) Date of Patent: Feb. 2, 2021

(54) DYNAMICALLY CONFIGURING 802.11AX EXTENDED RANGE SETTINGS BASED ON NETWORK MEASUREMENTS

(71) Applicant: Cisco Technology, Inc., San Jose, CA (US)

(72) Inventors: Gautam D. Bhanage, Milpitas, CA (US); Pooya Monajemi, Irvine, CA (US); Matthew Aaron Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/293,057

(22) Filed: Mar. 5, 2019

(65) Prior Publication Data

US 2020/0287763 A1 Sep. 10, 2020

(51) Int. Cl.
| | | |
|---|---|---|
| H04W 4/00 | (2018.01) | |
| H04L 27/26 | (2006.01) | |
| H04B 17/318 | (2015.01) | |
| H04B 17/336 | (2015.01) | |
| H04L 5/00 | (2006.01) | |

(52) U.S. Cl.
CPC ....... *H04L 27/2607* (2013.01); *H04B 17/318* (2015.01); *H04B 17/336* (2015.01); *H04L 5/0007* (2013.01)

(58) Field of Classification Search
CPC . H04L 27/2607; H04L 5/0007; H04B 17/318; H04B 17/336

USPC .......................................................... 370/329
See application file for complete search history.

(56) References Cited

U.S. PATENT DOCUMENTS

| | | | | |
|---|---|---|---|---|
| 2005/0180313 | A1* | 8/2005 | Kim ...................... | H04L 5/0042 370/208 |
| 2014/0192846 | A1* | 7/2014 | Afkhami .................. | H04B 3/46 375/219 |
| 2014/0229666 | A1* | 8/2014 | Schoenborn ........... | G11C 29/06 711/105 |
| 2014/0355626 | A1* | 12/2014 | Fechtel .................... | H04L 69/22 370/474 |
| 2016/0065467 | A1 | 3/2016 | Wu et al. | |
| 2017/0099089 | A1 | 4/2017 | Liu et al. | |
| 2018/0302858 | A1 | 10/2018 | Son et al. | |

OTHER PUBLICATIONS

Keysight Technologies, "5 New Features and Test Challenges for 802.11ax", 5992-2954EN, May 3, 2018, 14 pages.

(Continued)

*Primary Examiner* — Mang Hang Yeung
(74) *Attorney, Agent, or Firm* — Edell, Shapiro & Finnan, LLC

(57) ABSTRACT

A method includes obtaining configuration parameters of wireless client devices served by an access point in a wireless local area network basic service set; calculating a conservativeness scaling factor for a first wireless client device in the basic service set based on the configuration parameters; determining a new guard interval of an orthogonal frequency division multiplexed symbol for the first wireless client device based on the conservativeness scaling factor; and replacing an old guard interval for the first wireless client device with the new guard interval.

20 Claims, 10 Drawing Sheets

(56) References Cited

OTHER PUBLICATIONS

Huseyin Arslan et al., "Delay Spread Estimation for Wireless Communication Systems", Proceedings of the Eighth IEEE International Symposium on Computers and Communication (ISCC'03), Jul. 3, 2003, 6 pages.

Cetin Kurnaz et al., "Investigating the relation between optimum guard interval and channel delay spread for a MC-CDMA system", Turk J Elec Eng & Comp Sci, vol. 20, No. 3, 2012, doi:10.3906/elk-1003-431, 14 pages.

Qiao Qu et al., "Survey and Performance Evaluation of the Upcoming Next Generation WLANs Standard—IEEE 802.11ax", Jun. 15, 2018, 55 pages.

* cited by examiner

400

402 — DETERMINING WHETHER A FRAME TRANSMISSION AIRTIME FRACTION OF THE WIRELESS CLIENT DEVICE AS A PART OF THE TOTAL AIRTIME USED IN THE BASIC SERVICE SET IS LESS THAN A FIRST THRESHOLD

404 — DETERMINING WHETHER A DISTANCE BETWEEN THE WIRELESS CLIENT DEVICE AND AN ACCESS POINT OF THE BSS IS GREATER THAN A SECOND THRESHOLD

406 — DETERMINING WHETHER THE WIRELESS CLIENT DEVICE IS DEPLOYED IN OUTDOORS

408 — DETERMINING WHETHER A FRACTION OF PEER WIRELESS CLIENT DEVICES OTHER THAN THE WIRELESS CLIENT DEVICE USING AN EXTENDED RANGE SETTING IN THE BASIC SERVICE SET IS EQUAL TO OR GREATER THAN A THIRD THRESHOLD

410 — DETERMINING WHETHER A FRACTION OF PEER WIRELESS CLIENT DEVICES OTHER THAN THE WIRELESS CLIENT DEVICE USING A GUARD INTERVAL MORE THAN 800 NANO-SECOND IS EQUAL TO OR GREATER THAN A FOURTH THRESHOLDD

412 — DETERMINING WHETHER A PACKET ERROR RATE FOR THE WIRELESS CLIENT DEVICE IS GREATER THAN A FIFTH THRESHOLD

414 — CALCULATING A CONSERVATIVENESS SCALING FACTOR FOR THE WIRELESS CLIENT DEVICE BASED ON ONE OR MORE OF THE ABOVE DETERMINATIONS

FIG.4

DYNAMICALLY CONFIGURING 802.11AX EXTENDED RANGE SETTINGS BASED ON NETWORK MEASUREMENTS

TECHNICAL FIELD

The present disclosure relates to techniques for dynamically configuring IEEE 802.11ax extended range (ER) settings based on network measurements.

BACKGROUND

The IEEE 802.11ax standard provides better spectral efficiency, capacity, and coverage in dense deployment scenarios and outdoor environments. The 802.11ax standard supports increasing link reliability for outdoor environments at the Physical (PHY) layer using multiple mechanisms. First, the 802.11ax standard allows an increased guard interval for an orthogonal frequency division multiplexed (OFDM) beyond 0.8 micro-seconds (µs) including 1.6 µs and 3.2 µs. Second, the 802.11ax standard provides an extended range PHY mode that improves the reliability of a frame preamble. For example, under the extended range PHY mode, certain signal fields in the preamble are boosted by 3 dB; the high-efficiency long training field (HE-LTF) may be repeated; a legacy signal field (L-SIG) and a high-efficiency signal field (HE-SIG-A) signal fields are repeated twice; and the system can transmit ER beacons.

BRIEF DESCRIPTION OF THE DRAWINGS

FIG. 4 is a flow chart illustrating a method for calculating a conservativeness scaling factor used for dynamically modifying ER settings for a wireless client device, according to one example embodiment.

DESCRIPTION OF EXAMPLE EMBODIMENTS

Overview

Techniques are provided herein for dynamically configuring settings for increasing link reliability for one or more wireless client devices. A network controller obtains configuration parameters of wireless client devices in a basic service set that includes an access point in communication with the network controller. The access point serves wireless communication with the wireless client devices. A conservativeness scaling factor is calculated for a first wireless client device in the basic service set based on the configuration parameters. A new guard interval of an orthogonal frequency division multiplexed symbol is determined for the first wireless client device based on the conservativeness scaling factor. An old guard interval of the first wireless client device is then replaced with the new guard interval.

Example Embodiments

Generally, the extended range (ER) Physical (PHY) mode settings in the IEEE 802.11ax standard are configured once by an administrator. The settings are static and would not be changed during operations. While the ER PHY mode has been provided in the standard for improving performance in outdoor environments, the one-and-only setting may not be a suitable solution for all environments because of the associated operating overheads. For example, repeating a high-efficiency long training field (HE-LTF) can consume variable duration per symbol, and in some cases it can consume up to 4 µs per repetition. Also, when ER physical protocol data units (PPDUs) are used, the high-efficiency signal field (HE-SIG-A) duration increases from the normal 8 µs to 16 µs. At high operating bandwidths of 80 MHz to 160 MHz, incorrectly selecting a modulation and coding scheme for ER settings can result in end-user performance degradation.

A commercially available rate control solution uses packet error rates to determine whether to enable the ER PHY mode. A packet error rate is a broad metric that captures overall link reliability. Thus, observing a high packet error rate on a link does not necessarily suggest that switching to the ER PHY mode would provide improved performance. For example, a high packet error rate could result from signal interference. In such a case, switching to the ER PHY mode would actually make the link performance worse. Accordingly, techniques presented herein provide a solution to determine proper times and configurations for dynamically configuring/modifying the ER PHY mode settings. It is to be understood that the term "ER PHY mode settings" as used in this disclosure is interchangeable with the term "ER settings."

Figure 1:
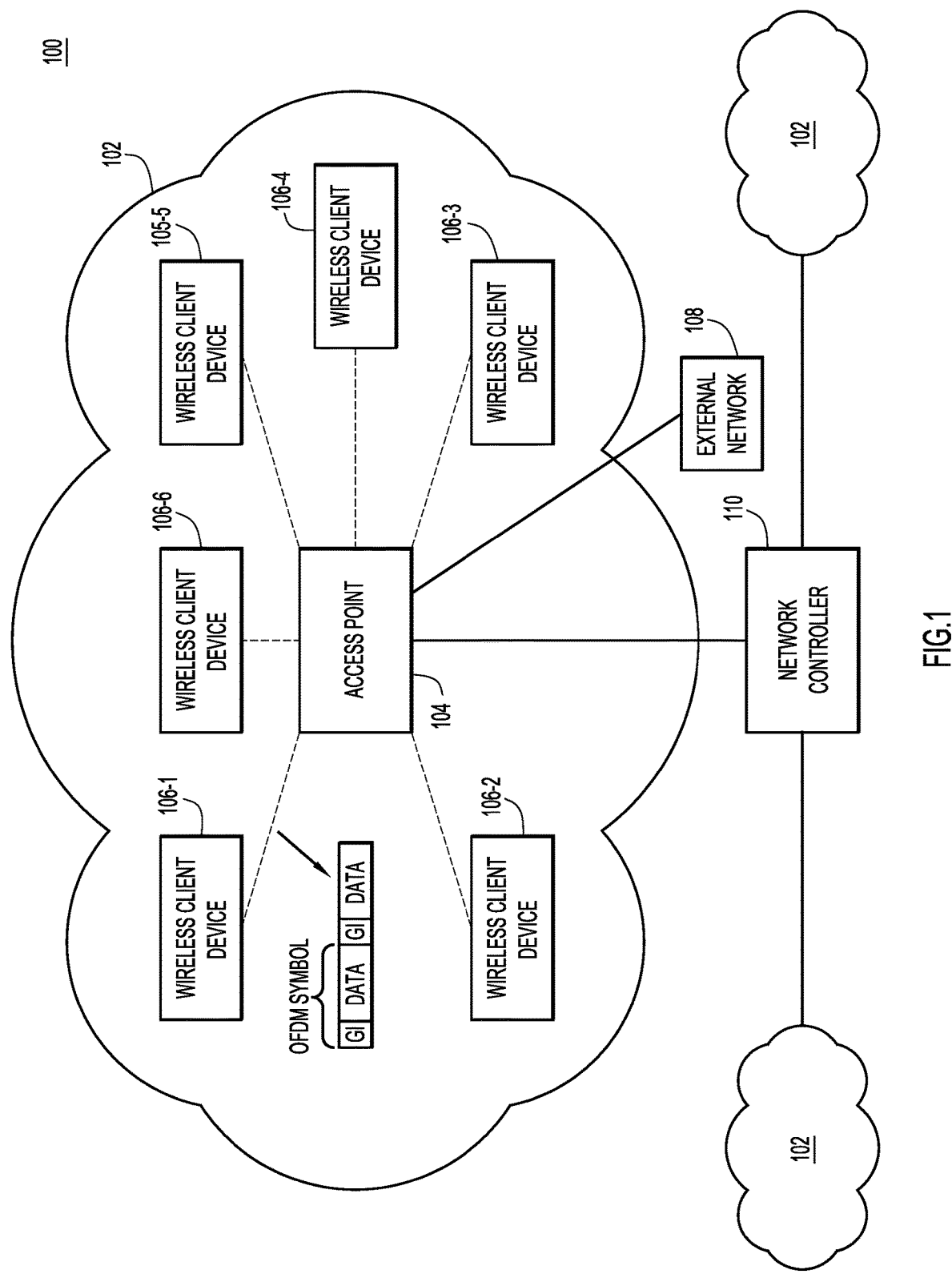
FIG. 1 illustrates a communication system in which the techniques for dynamically modifying extended range PHY mode settings for one or more wireless client devices may be applied, according to an example embodiment.

Example embodiments will be explained in connection with the accompanying figures. Reference is first made to FIG. 1. FIG. 1 depicts a communication system 100 in which the techniques for dynamically modifying ER PHY mode settings for one or more wireless client devices can be applied, according to an example embodiment. The communication system 100 includes one or more basic service sets 102. Although three basic service sets 102 are illustrated in FIG. 1, it is to be understood that any number of basic service sets can be included in the communication system 100. A basic service set 102 may be a wireless local area network (WLAN) that includes an access point 104 and one or more wireless client devices, such as wireless client devices 106-1, 106-2, 106-3, 106-4, 106-5 and 106-6, collectively referred to as wireless client devices 106. Although six wireless client devices 106-1 to 106-6 are shown in FIG. 1, any suitable number of wireless client device can be included in a basic service set. The wireless client devices 106 communicate to an external network 108 through the access point 104. The access point 104 is configured to advertise its existence by broadcasting its Service Set Identifier (SSID). Any client wireless device that needs to connect to the access point 104 sends an association request to the access point 104. The wireless client devices 106 may be a desktop computer, a laptop computer, a mobile phone, a portable electronic device, a printer, a television, an appliance, or any other suitable wireless electronic device. While FIG. 1 shows a line connecting between the wireless client devices 106-1 and the access point 104 it is to be understood that this is a wireless connection. The network controller 110 is in communication with the access point 104 by, for example, a network connection. The network controller 110 is configured to dynamically modify ER settings for the wireless client devices 106 in the basic service set 102. In some embodiments, the functions of the network controller 110 described herein may be integrated with the access point 104. In other words, the access point 104 may perform the functions described herein.

In some embodiments, the wireless client devices 106 may communicate data using orthogonal frequency division multiplexed (OFDM) symbols. The beginning of each OFDM symbol is a guard interval (GI) configured to reduce interference between data portions of the OFDM symbols, as illustrated in FIG. 1.

The network controller 110 is configured to dynamically modify ER settings for the wireless client devices 106. In some embodiments, the network controller 110 requests the access point 104 to report its configuration and state parameters to the network controller 110. For example, the configuration and state parameters may include channel state information, fine timing measurement results, a type of deployment (indoor or outdoor), current ER settings, etc. Based on the configuration parameters that the access point 104 maintains for the wireless client devices 106, the network controller 110 calculates a conservativeness scaling factor for each of the wireless client devices 106. It should be understood that while this disclosure describes that the network controller 110 performs the operations to dynamically modify ER settings for wireless client devices 106, the access point 104 can perform these operations when the network controller 110 is integrated with the access point 104.

In some embodiments, the network controller 110 is configured to calculate a conservativeness scaling factor for a wireless client device, e.g., wireless client device 106-1 (a first wireless client device), based on one or more of the following factors, including whether: (1) a frame transmission airtime fraction of the first wireless client device 106-1 as a part of the total airtime used in the basic service set is less than a first threshold; (2) a distance between the first wireless client device 106-1 and the access point 104 is greater than a second threshold; (3) the first wireless client device 106-1 is deployed in outdoors; (4) a fraction of the wireless client devices 106 other than the first wireless client device 106-1 using an ER setting in the basic service set is equal to or greater than a third threshold; (5) a fraction of the wireless client devices 106 other than the first wireless client device 106-1 using a guard interval more than 800 nanoseconds is equal to or greater than a fourth threshold; and (6) a packet error rate for the first wireless client device 106-1 is greater than a fifth threshold.

In some embodiments, the conservativeness scaling factor for the first wireless client device 106-1 may be generated by taking all of the above factors into consideration. For example, each of the factors may be given a value, and the conservativeness scaling factor may be a sum of those values. In one embodiment, the conservativeness scaling factor may be scaled to from 0 to 1. In some embodiments, each of the factors may be weighted in calculating the conservativeness scaling factor. In one embodiment, the conservativeness scaling factor is increased when each of the above factors is determined to be true.

Once a conservativeness scaling factor (Si) for a wireless client device is generated, the network controller 110 is configured to determine a new guard interval of an orthogonal frequency division multiplexed (OFDM) symbol for the wireless client device based on the conservativeness scaling factor. In some embodiments, before the network controller 110 proceeds to determine a new guard interval for a wireless client device, e.g., the first wireless client device 106-1, the network controller 110 may first determine whether the link performance between the access point 104 and the first wireless client device 106-1 is satisfactory. If the link performance of the first wireless client device 106-1 is satisfactory, the network controller 110 takes no further action to modify the ER settings for the first wireless client device 106-1. If the network controller 110 determines that it is desirable to modify the ER settings for the first wireless client device 106-1 to improve its link performance, the network controller 110 reads/obtains the current guard interval setting (Gi) for the first wireless client device 106-1. The network controller 110 obtains the channel state information associated with the first wireless client device 106-1 and calculates a delay spread (DSi) for the first wireless client device 106-1 based on the channel state information. The network controller 110 generates a new guard interval Gn based on the delay spread DSi and the conservativeness scaling factor Si. In one embodiment, the new guard interval Gn is calculated according to:

$$Gn=M*Si*DSi;$$

where M is a general scaling factor set between 2 to 4 (2<M<4) in a wireless system.

In some embodiments, the calculated new guard interval Gn is a proposed guard interval to conform to an allowable guard interval of a wireless communication standard, e.g., an 802.11 standard. For example, an allowable guard interval under the 802.11ax standard is one of 0.8 µs, 1.6 µs, and 3.2 µs. The network controller 110 compares the proposed guard interval to a plurality of allowable guard intervals, and selects an allowable guard interval that is closest to the proposed guard interval as the new guard interval for the first wireless client device 106-1.

After the new guard interval is determined for the first wireless client device 106-1, the new guard interval is employed to replace an old guard interval for the first wireless client device 106-1. In some embodiments, a guard interval for a wireless client device is increased when the conservativeness scaling factor of the wireless client device is increased to improve the link stability.

In some embodiments, the new guard interval is not implemented immediately after it is generated by the network controller 110. For example, the network controller 110 may detect that the old guard interval was recently implemented and delay replacing the old guard interval with the new guard interval to allow the prior change to take effect. In some embodiments, the network controller 110 may determine a wait time period for implementing the new guard interval. In one embodiment, the wait time period is determined based on the conservativeness scaling factor. For example, the new guard interval may be obtained by repeating, a number (N) of times, obtaining configuration parameters of wireless client devices, calculating a conservativeness scaling factor for the wireless client device, and determining a guard interval for the wireless client device based on the conservativeness scaling factor. In one embodiment, the network controller 110 is configured to replace the old guard interval with the new guard interval until after a subsequent number of iterations of the obtaining, the calculating, and the determining are performed, where the subsequent number equals to a nearest integer of (N/the conservativeness scaling factor).

In some embodiments, in addition to changing the guard interval for the wireless client device, the network controller 110 may determine that it is desirable to enable an ER mode for the wireless client device. For example, the network controller 110 may determine whether a transmission rate of the wireless client device has been reduced to less than a predetermined rate and whether the old guard interval is already a maximum allowable guard interval under the wireless communication standard. In response to determining that the transmission rate of the wireless client device has been reduced to less than the predetermined rate and that the old guard interval is the maximum allowable guard interval, the network controller 110 is configured to enable an ER mode for the wireless client device.

In some embodiments, the network controller 110 may determine that it is desirable to provide further link stability for the wireless client device. For example, after applying the maximum allowable guard interval and enabling the ER mode for the wireless client device, the network controller 110 may determine that the wireless client device is located more than a predetermined distance from the access point 104. In response, the network controller 110 enables repetition of an HE-LTF in a preamble of a packet for the wireless client device 106-1.

In some embodiments, the network controller 110 may determine that the wireless client device 106-1 is located more than a predetermined distance from the access point 104 using the following operations. For example, the network controller 110 obtains a signal-to-noise ratio (SNR) and a received signal strength indicator (RSSI) for the wireless client device 106-1. In some embodiments, the SNR and the RSSI for the wireless client device 106-1 may be calculated by the access point 104 and provided to the network controller 110. In some embodiments, the SNR and the RSSI for the wireless client device 106-1 may be calculated by the network controller 110 based on information received by the access point 104 from the wireless client device 106-1. The network controller 110 further determines whether a ratio of the SNR to the RSSI is less than a predetermined threshold. In response to determining that the ratio of the SNR to the RSSI is less than the predetermined threshold, the network controller 110 determines that the wireless client device 106-1 is located more than the predetermined distance from the access point 104. Based on the determination, the network controller 110 may enable repetition of a HE-LTF in a preamble of a packet for the wireless client device 106-1 as described above.

Although the embodiments provided herein describes modifying ER settings for the wireless client device 106-1 as an example, those embodiments may also be applied to other wireless client devices 106 in the basic service set 102.

The techniques disclosed herein dynamically customize the ER mode support for one or more wireless client devices based on consensus from multiple factors illustrated above. The techniques dynamically configure ER PPDU settings with enhanced HE-SIG-A, HE-LTF repetitions and/or the guard interval when long delay spreads occur in the system. The techniques provide a dynamic approach for ER PHY settings to make link changes that converges to an optimal solution faster.

Figure 2:
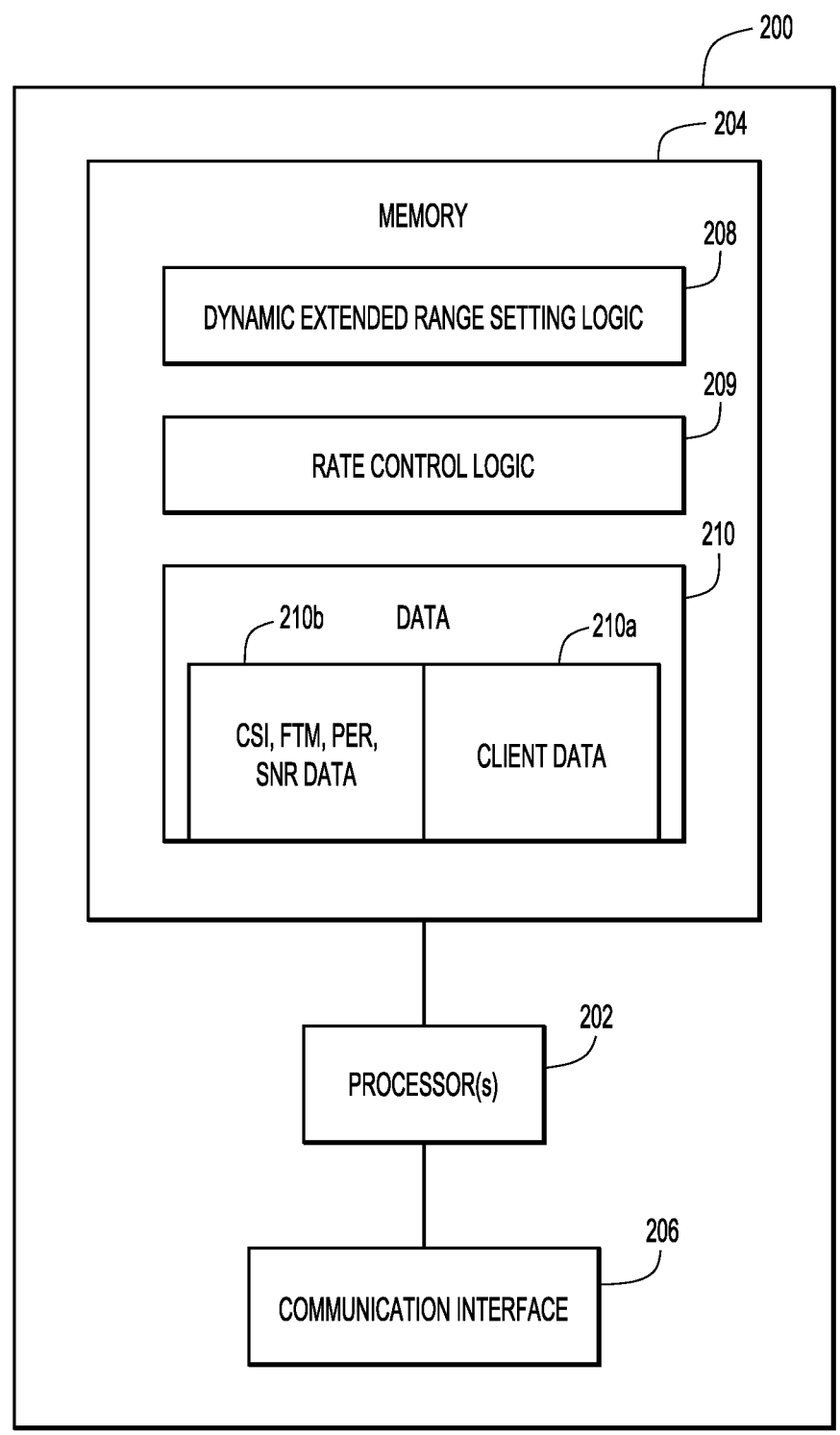
FIG. 2 depicts a block diagram of a network controller/access point for dynamically configuring an ER setting for one or more wireless client devices in a basic service set, according to one example embodiment.

FIG. 2 depicts a block diagram of a network controller or access point for dynamically configuring ER setting for one or more wireless client devices, according to one example embodiment. The network controller 200 can be the network controller 110 in FIG. 1. The network controller 200 includes a processor 202, a memory 204, and a communication interface 206. The processor 202 may be a microprocessor or microcontroller (or multiple instances of such components) that is configured to execute program logic instructions (i.e., software modules) for carrying out various operations and tasks described herein. For example, the processor 202 is configured to execute instructions stored in the memory 204 for calculating a conservativeness scaling factor for a wireless client device in the basic service set based on configuration parameters, determining a new guard interval of an OFDM symbol for the wireless client device based on the conservativeness scaling factor, replacing an old guard interval of the wireless client device with the new guard interval, and other operations disclosed herein.

The memory 204 may include read only memory (ROM), random access memory (RAM), magnetic disk storage media devices, optical storage media devices, flash memory devices, electrical, optical or other physical/tangible memory storage devices. The memory 204 stores a dynamic ER setting logic 208 that includes computer-readable instructions for carrying out various operations and tasks described herein. The memory 204 further stores a rate control logic 209 that includes computer-readable instructions for tracking capacities of link performances for wireless client devices and provides rate control over the wireless client devices. The memory 204 also stores data 210 for various operations performed by the network controller 200. For example, the data 210 contain client data 210a that includes various configuration parameters and capacity inputs from one or more wireless client devices. The data 210 further contain other statistics 210b obtained from wireless client devices or computed by the network controller 200. For example, the statistics 210b may include channel state information (CSI), fine timing measurements (FTM), packet error rate (PER), signal-to-noise ratio (SNR) data, etc.

The functions of the processor 202 may be implemented by logic encoded in one or more tangible (non-transitory) computer-readable storage media (e.g., embedded logic such as an application specific integrated circuit, digital signal processor instructions, software that is executed by a processor, etc.), wherein the memory 204 stores data used for the operations described herein and stores software or processor executable instructions that are executed to carry out the operations described herein.

In one embodiment, the processor 202 may be embodied by digital logic gates in a fixed or programmable digital logic integrated circuit, which digital logic gates are configured to perform operations described herein. In general, the dynamic extended range setting logic 208 and the rate control logic 209 may be embodied in one or more computer-readable storage media encoded with software comprising computer executable instructions and when the software is executed operable to perform the operations described herein.

The communication interface 206 is configured to transmit communications to, and receive communications from, a computer network for the network controller 200. In one example, the communication interface 206 may take the form of one or more network interface cards.

Figure 3:
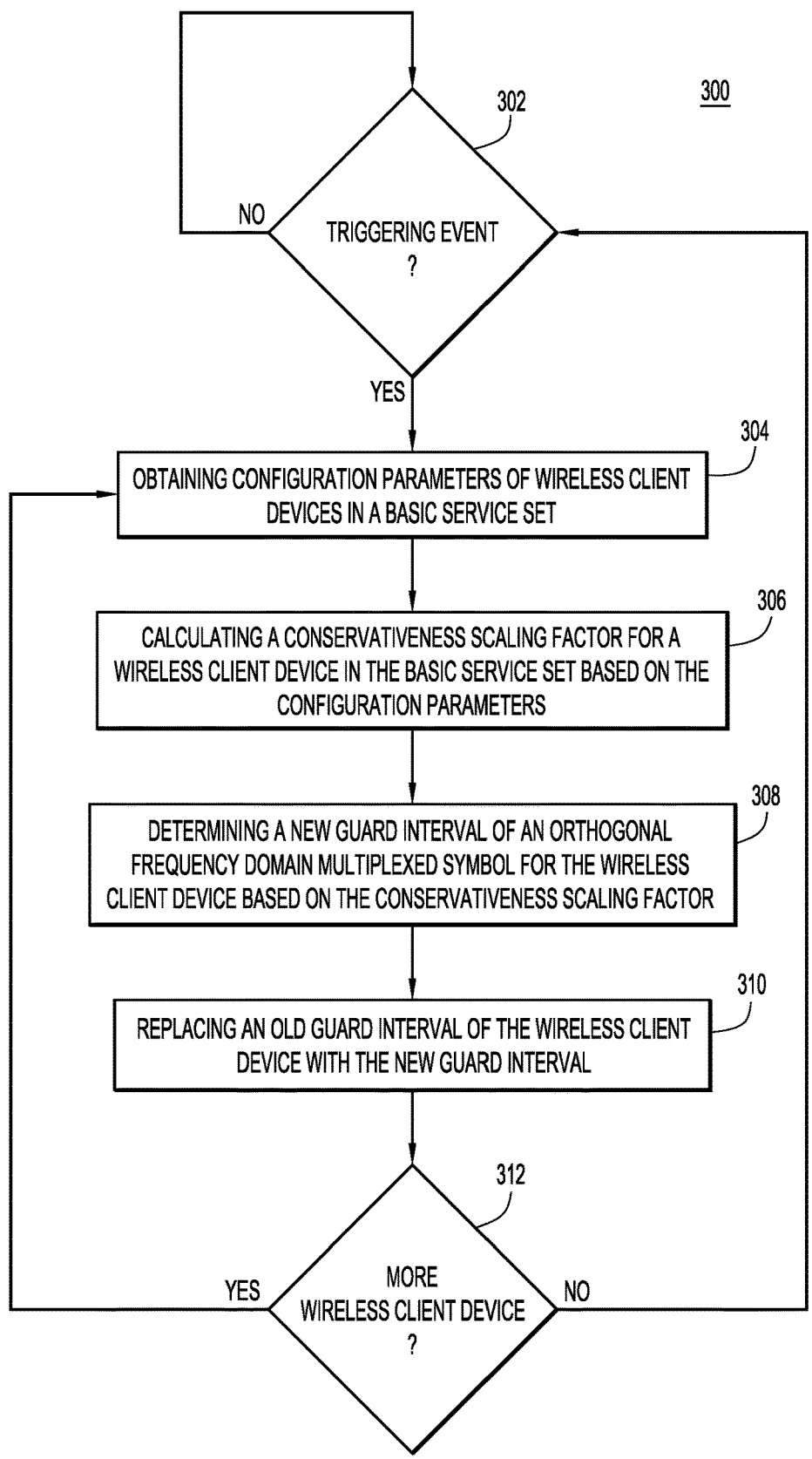
FIG. 3 is a flow chart illustrating a method for dynamically configuring ER settings for one or more wireless client devices in a basic service set, according to one example embodiment.

FIG. 3 is a flow chart illustrating a method 300 for dynamically configuring ER settings for one or more wireless client devices in a basic service set, according to one example embodiment. For example, the method 300 can be performed by a network controller, such as the network controller 110 in FIG. 1 and the network controller 200 in FIG. 2. At 302, the network controller determines whether a triggering event to modify ER settings for a wireless client device is detected. For example, the triggering event may include, but not limited to, that a new wireless client device joins the basic service set, that a location of a wireless client device is changed, that a time period elapses, or that an operation parameter of a wireless client device has been changed. If a triggering event is not detected (No at 302), the network controller waits for a triggering event to occur. If a triggering event is detected (Yes at 302), at 304 the network controller obtains configuration and state parameters of the wireless client devices in the basic service set. For example, after detecting the triggering event, the network controller may send requests for configuration parameters to the wireless client devices in the basic service set via an access point of the basic service set, and collect responses therefrom. The configuration parameters may include the current ER settings of the wireless client devices. For example, the network controller may obtain the current guard interval(s) used by the wireless client devices, information regarding whether an ER mode is enabled for each of the wireless client devices, or whether the wireless client devices are deployed indoors or outdoors.

At 306, the network controller calculates a conservativeness scaling factor for a first wireless client device in the basic service set based on the configuration parameters. In some embodiments, the network controller calculates the conservativeness scaling factor using multiple factors including parameters employed by the wireless client device and those used by peer wireless client devices in the basic service set. For example, the network controller may examine information indicating what percentage of the peer devices are using ER settings and use that information as a factor in calculating the conservativeness scaling factor for the first wireless client device. In one embodiment, the network controller may use traffic patterns of the first wireless client device in calculating the conservativeness scaling factor. For example, the network controller may determine whether the first wireless client device receives traffic sporadically, and use that information in calculating the conservativeness scaling factor.

At 308, the network controller determine a new guard interval of an OFDM symbol for the first wireless client device based on the conservativeness scaling factor. In some embodiments, the new guard interval is proportional to the conservativeness scaling factor. For example, the new guard interval is set to be greater than the old guard interval when the conservativeness scaling factor is increased; and the new guard interval is set to be less than the old guard interval when the conservativeness scaling factor is decreased. In some embodiments, the network controller may need to iterate multiple times the operations 302-306 before a new guard interval can be obtained.

At 310, the network controller replaces an old guard interval for the wireless client device with the new guard interval. In some embodiments, the network controller may instruct the wireless client device to send its frames using the new guard interval. In some embodiments, the new guard interval is not implemented immediately after it is obtained. For example, the network controller may determine that the old guard interval is recently implemented in the prior iteration of operations 302-308 and wait until a number of subsequent iterations is performed to implement the new guard interval. This allows the old guard interval to take effect before implementing the new guard interval.

At 312, the network controller determines whether there are more wireless client devices in the basic service set whose ER settings are in need of updates. If the network controller determines that a second wireless client device in the basic service set whose ER settings is in need of updates (Yes at 312), the network controller repeats operations 304-310 to determine another new guard interval for the second wireless client device. If the network controller determines that no wireless client device in the basic service set is in need of updating ER settings (No at 312), the network controller waits for another triggering event to occur (302).

FIG. 4 is a flow chart illustrating a method 400 for calculating a conservativeness scaling factor used for dynamically modifying ER settings for a wireless client device, according to one example embodiment. For example, the method 400 can be performed by a network controller, such as the network controller 110 in FIG. 1 and the network controller 200 in FIG. 2. At 402, the network controller determines whether a frame transmission airtime fraction for the wireless client device as a part of the total airtime used in the basic service set is less than a first threshold. At 404, the network controller determines whether a distance between the wireless client device and the access point in the basic service set is greater than a second threshold. At 406, the network controller determines whether the wireless client device is deployed outdoors. At 408, the network controller determines whether a fraction of the peer wireless client devices other than the wireless client device using an ER setting in the basic service set is equal to or greater than a third threshold. At 410, the network controller determines whether a fraction of the peer wireless client devices other than the wireless client device using a guard interval more than 800 nano-seconds is equal to or greater than a fourth threshold. At 412, the network controller determines whether a packet error rate for the wireless client device is greater than a fifth threshold. In some embodiments, each of the above determinations results in assigning a value for the respective determination. For example, a "true" determination to each of the 402-412 operations is given a value of one, while a "false" determination is given a value of zero. Other scoring scheme may be employed. It is to be understood that the sequence of the operations 402-412 may be changed. For example, the network controller may execute operations 402-412 based on a weighted importance in calculating a conservativeness scaling factor. In one embodiment, operation 406 may be given a greatest weight and is executed by the network controller prior to all other operations.

At 414, the network controller calculating a conservativeness scaling factor based on one or more of values obtained in operations 402-412. In one embodiment, the network controller may add one or more of the values to generate the conservativeness scaling factor. In one embodiment, the network controller may scale the conservativeness scaling factor to between zero (inclusive) and one (inclusive). In some embodiments, each of the values obtained in operations 402-412 may be weighted in calculating the conservativeness scaling factor.

Figure 5:
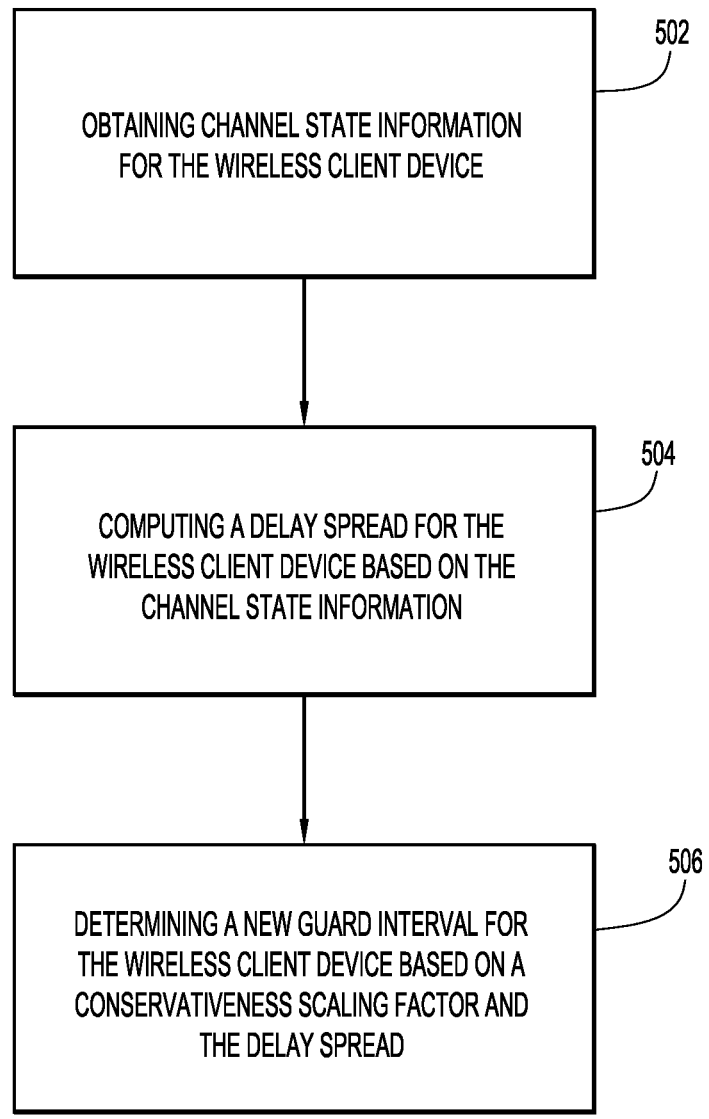
FIG. 5 is a flow chart illustrating a method for determining a new guard interval of an orthogonal frequency division multiplexed symbol for a wireless client device, according to one example embodiment.

FIG. 5 is a flow chart illustrating a method 500 for determining a new guard interval of an OFDM symbol for a wireless client device, according to one example embodiment. For example, the method 500 can be performed by a network controller, such as the network controller 110 in FIG. 1 and the network controller 200 in FIG. 2. At 502, the network controller obtains channel state information for the wireless client device. For example, the network controller may send a request to the access point 104 and receive the channel state information therefrom for the wireless client device. In some embodiments, the network controller may query a storage, such as a memory associated with the network controller, for the channel state information already obtained by the network controller for the wireless client device. At 504, the network controller computes a delay spread for the wireless client device based on the channel state information. At 506, the network controller determines the new guard interval for the wireless client device based on the delay spread and the conservativeness scaling factor for the wireless client device, such as the one determined at operation 414 in FIG. 4. In some embodiments, the new guard interval is calculated according to Gn=M*Si*DSi, where Gn is the new guard interval; M is a general scaling factor set between 2 to 4 (2<M<4); Si is the conservativeness scaling factor for the wireless client device; and DSi is the delay spread.

Figure 6:
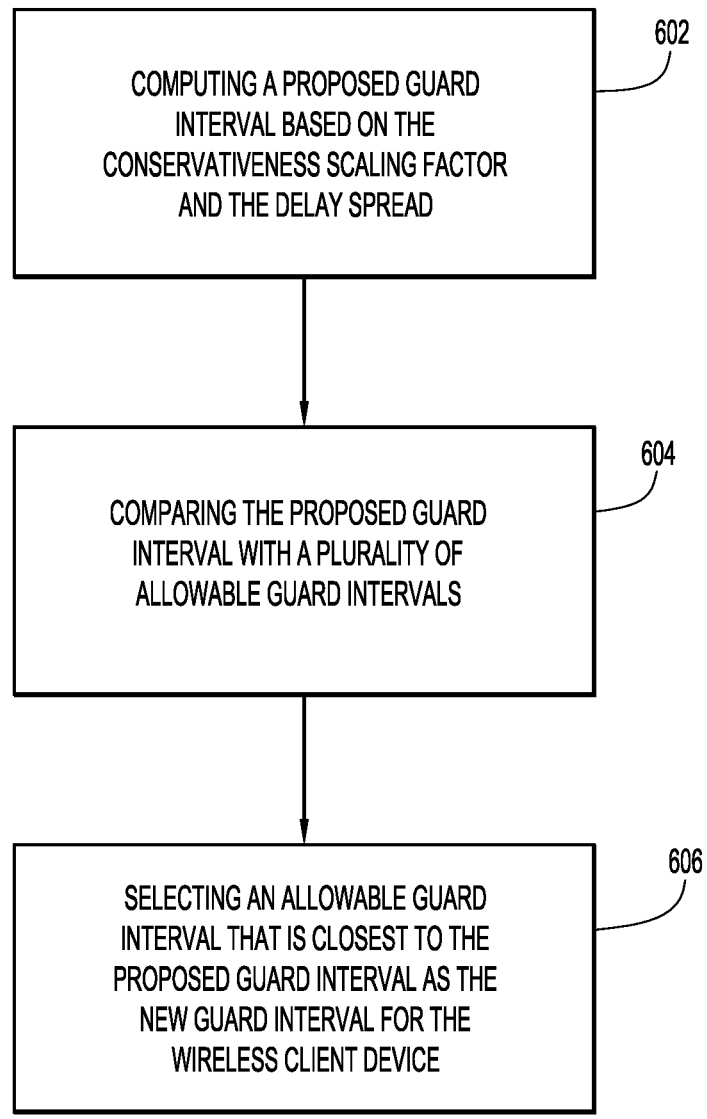
FIG. 6 is a flow chart illustrating a method for determining a new guard interval of an orthogonal frequency division multiplexed symbol for a wireless client device, according to one example embodiment.

FIG. 6 is a flow chart illustrating another method 600 for determining a new guard interval of an OFDM symbol for a wireless client device, according to one example embodiment. For example, the method 600 can be performed by a network controller, such as the network controller 110 in FIG. 1 and the network controller 200 in FIG. 2. At 602, the network controller computes a proposed guard interval based on a conservativeness scaling factor and a delay spread of the wireless client device. In some embodiments, the proposed guard interval may be computed according to the method 500 in FIG. 5. At 604, the network controller compares the proposed guard interval with a plurality of allowable guard intervals of a wireless communication protocol. For example, the allowable guard intervals for 802.11n/ac protocol include 0.4 μs and 0.8 μs, while the allowable guard intervals for 802.11ax protocol include 0.8 μs, 1.6 μs, and 3.2 μs. At 606, the network controller selects an allowable guard interval that is closest to the proposed guard interval as the new guard interval for the wireless client device.

Figure 7:
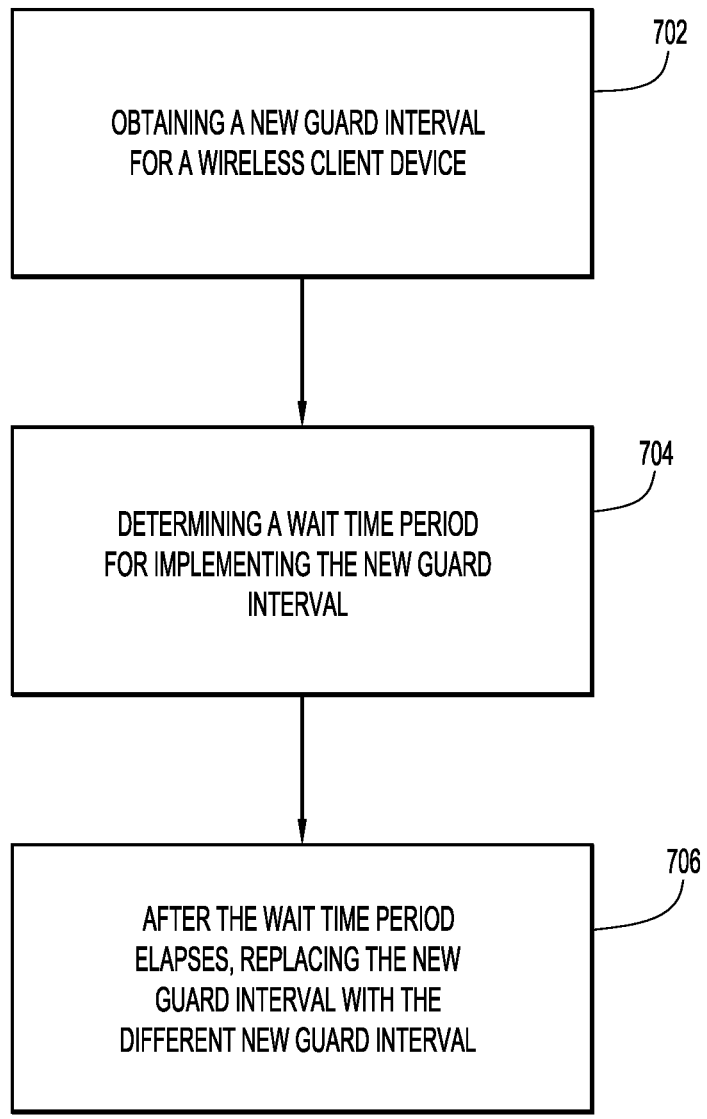
FIG. 7 is a flow chart illustrating a method for replacing an old guard interval with a new guard interval for a wireless client device, according to one example embodiment.

FIG. 7 is a flow chart illustrating a method 700 for replacing an old guard interval with a new guard interval for a wireless client device, according to one example embodiment. For example, the method 700 can be performed by a network controller, such as the network controller 110 in FIG. 1 and the network controller 200 in FIG. 2. With reference to both FIGS. 3 and 7, at 702 the network controller obtains a new guard interval for the wireless client device. For example, the network controller may obtain a new guard interval for the wireless client device according to the operations 304-308 in FIG. 3. In some embodiments, the network controller may repeat the operations 304-308 a number of times to obtain the new guard interval for the wireless client device. For example, the network controller may obtain no new guard interval after repeating the operations 304-308 three time and obtain a new guard interval the fourth time. At 704, the network controller determines a wait time period for implementing the new guard interval. For example, the network controller may determine the wait time period for implementing the new guard interval based on a conservativeness scaling factor for the wireless client device. In some embodiments, the network controller may wait until a predetermined number of subsequent iterations of operations 304-308 are performed before implementing the new guard interval. In one embodiment, the network controller may determine that the predetermined number of iterations equals to the nearest integer of (the number iterations to obtain the new guard interval/the conservativeness scaling factor). After the wait time period elapses, at 706 the network controller replaces the old guard interval for the wireless client device with the new guard interval.

Figure 8:
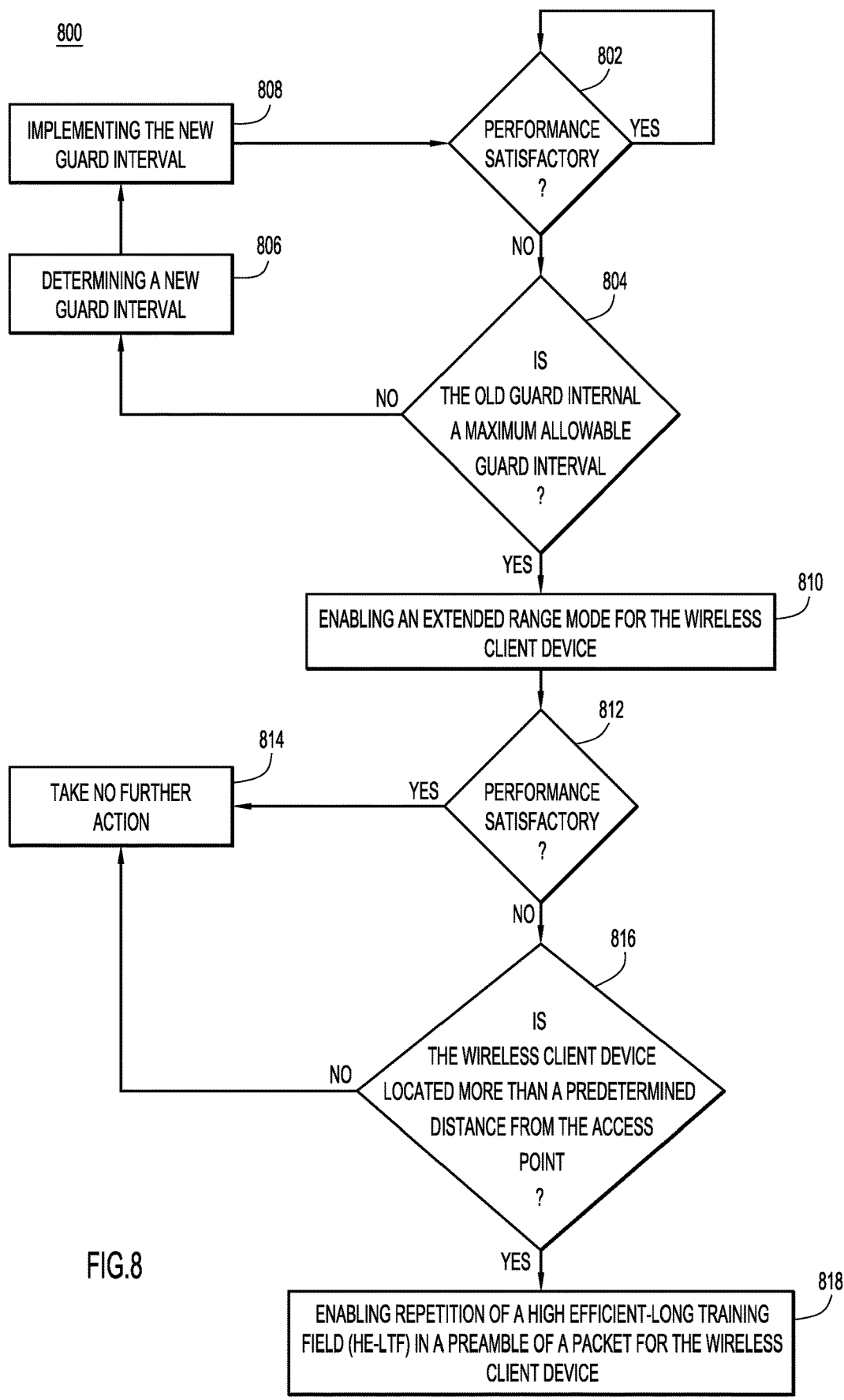
FIG. 8 is a flow chart illustrating a method for enabling ER settings for a wireless client device, according to one example embodiment.

FIG. 8 is a flow chart illustrating a method 800 for enabling ER settings for a wireless client device in a basic service set, according to one example embodiment. For example, the method 800 can be performed by a network controller, such as the network controller 110 in FIG. 1 and the network controller 200 in FIG. 2. At 802, the network controller determines whether a link performance for the wireless client device is satisfactory. For example, the network controller may determine that the link performance is not satisfactory by determining that a transmission rate of the wireless client device has been reduced to less than a predetermined rate. If the link performance for the wireless client device is satisfactory (Yes at 802), the network controller takes no further action to modify the ER settings for the wireless client device. If the link performance for the wireless client device is not satisfactory (No at 802), at 804 the network controller determines whether the current (old) guard interval in use is a maximum allowable guard interval under a communication protocol. For example, under the 802.11ax protocol, the maximum allowable guard interval is 3.2 μs. If the current guard interval in use is not the maximum allowable guard interval (No at 804), at 806 the network controller determines a new guard interval for the wireless client device. For example, a new guard interval for the wireless client device may be determined according to methods 300, 500 and 600 as described above. At 808, the network controller implements the new guard interval for the wireless client device and again determines whether the link performance for the wireless client device is satisfactory (802).

If the current guard interval in use is the maximum allowable guard interval (Yes at 804), at 810 the network controller enables an ER mode for the wireless client device. After the ER mode has been enabled, at 812 the network controller determines whether the link performance for the wireless client device is satisfactory. If the link performance for the wireless client device is satisfactory (Yes at 812), at 814 the network controller takes no further action to modify the ER settings for the wireless client device. If the link performance for the wireless client device is not satisfactory (No at 812), at 816 the network controller determines whether the wireless client device is located more than a predetermined distance from an access point in the basic service set. If the wireless client device is not located more than the predetermined distance from the access point (No at 816), the network controller takes no further action to modify the ER settings for the wireless client device (814). If the wireless client device is located more than the predetermined distance from the access point (Yes at 816), at 818 the network controller enables repetition of HE-LTF in a preamble of a packet for the wireless client device.

Figure 9:
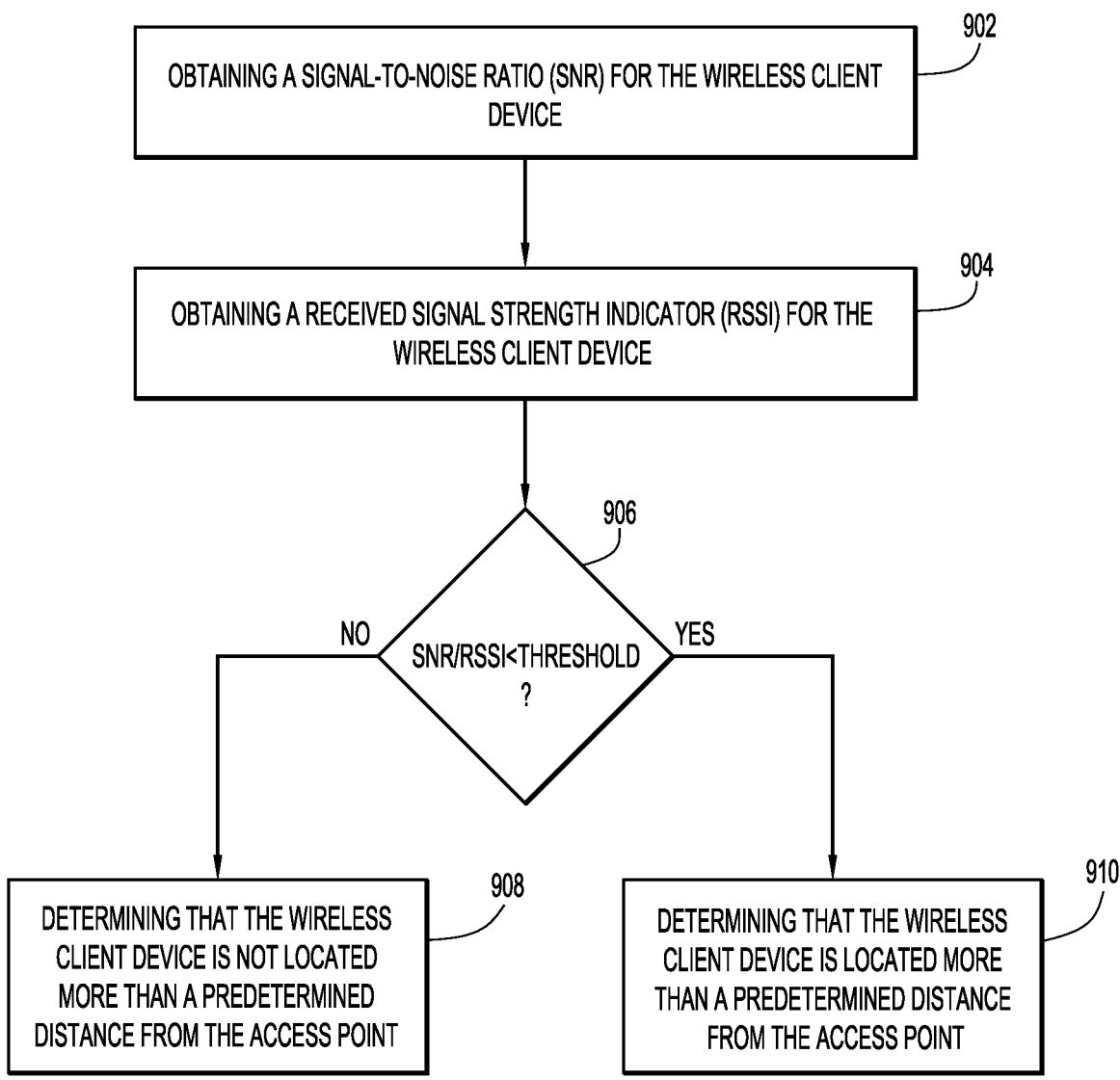
FIG. 9 is a flow chart illustrating a method for determining whether a wireless client device is located more than a predetermined distance from an access point in a basic service set, according to one example embodiment.

FIG. 9 is a flow chart illustrating a method 900 for determining whether a wireless client device is located more than a predetermined distance from an access point in operation 816 in FIG. 8, according to one example embodiment. For example, the method 900 can be performed by a network controller, such as the network controller 110 in FIG. 1 and the network controller 200 in FIG. 2. At 902, the network controller obtains a signal-to-noise ratio (SNR) for the wireless client device. At 904, the network controller obtains a received signal strength indicator (RSSI) for the wireless client device. At 906, the network controller determines whether a ratio of the SNR to the RSSI is less than a predetermined threshold. If the ratio of the SNR to the RSSI is not less than the predetermined threshold (No at 906), at 908 the network controller determines that the wireless client device is not located more than the predetermined distance from the access point. If the ratio of the SNR to the RSSI is less than the predetermined threshold (Yes at 906), at 910 the network controller determines that the wireless client device is located more than the predetermined distance from the access point.

Figure 10:
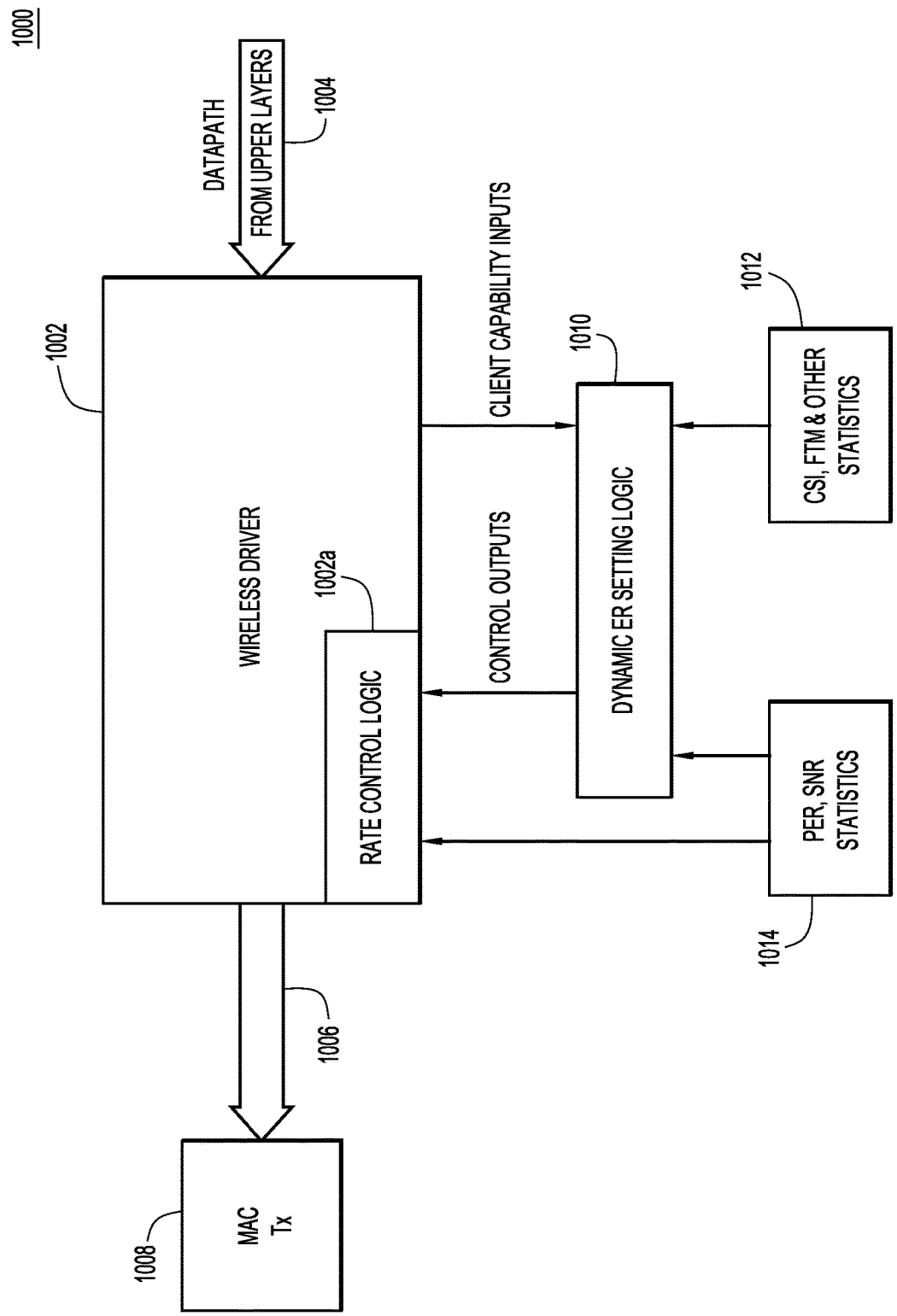
FIG. 10 illustrates a physical layer software architecture of a system for dynamically modifying ER settings for one or more wireless client devices in a basic service set, according to one example embodiment.

FIG. 10 illustrates a physical layer software architecture 1000 of an access point configured to dynamically modify ER settings for one or more wireless client devices (clients) in a basic service set, according to one example embodiment. As explained above, an access point, such as access point 104 shown in FIG. 1, may be configured to perform the process of dynamically modifying ER settings for one or more client devices. The software architecture 1000 includes a wireless driver 1002 configured to receive data from upper layers 1004 and output control signals 1006 to a media access control (MAC) transmit (Tx) function 1008. The wireless driver 1002 includes a rate control logic 1002a for performing transmission rate control for the clients. The wireless driver 1002 interacts with a dynamic ER setting logic 1010 to provide the control signals 1006. In some embodiments, the wireless driver 1002 forwards client capacity inputs to the dynamic ER setting logic 1010. The dynamic ER setting logic 1010 also receives channel state information (CSI), fine timing measurements (FTM), and other statistics (1012), and packet error rate (PER), signal-to-noise ratio (SNR) statistics (1014) for generating control outputs to the rate control logic 1002a. The dynamic ER setting logic 1010 is configured to perform the methods as described herein. In some embodiments, the rate control logic 1002a may receive the PER and SNR statistics 1014 for controlling transmission rates of the clients.

Techniques disclosed herein dynamically customize ER settings for one or more wireless client devices based on multiple factors. The techniques dynamically configure ER PPDU settings with the enhanced HE-SIG-A, HE-LTF repetitions and/or the guard interval when long delay spreads occur in the system. The techniques provide a dynamic approach for ER PHY settings to make link changes that converges to an optimal solution.

In some embodiments, techniques for dynamically modifying ER PHY settings are configured to be a slowly modified loop. For example, the computations described herein are performed very infrequently and the ER PHY settings are modified generally with a drastic change in the environment. As a result, the cost for implementing these techniques is relatively low.

In some embodiments, the various network measurements are exported to a single central point such as a network controller such that the computations can be performed on a powerful machine, which also is able to analyze traffic patterns in addition to linear computations.

In some embodiments, fine timing measurements may be performed using an extended interval between receiving acknowledgements. For example, if a client is 1600 ft. away, it takes about 1.6 µs for a packet to travel. Using an extended interval between receiving acknowledgements in fine timing measurements may ensure that the network controller receives the measurement results. In some embodiments, the techniques for dynamically modifying ER settings can be also implemented on a machine learning system to detect and leverage traffic patterns in the environment.

In one aspect, a method is provided. The method includes: obtaining configuration parameters of wireless client devices served by an access point in a wireless local area network basic service set; calculating a conservativeness scaling factor for a first wireless client device in the basic service set based on the configuration parameters; determining a new guard interval of an orthogonal frequency division multiplexed symbol for the first wireless client device based on the conservativeness scaling factor; and replacing an old guard interval for the first wireless client device with the new guard interval.

In another aspect, an apparatus is provided. The apparatus includes a network interface that enables network communications, a processor, and a memory to store data and instructions executable by the processor. The processor is configured to execute the instructions to: obtain configuration parameters of wireless client devices in a basic service set of a wireless local area network that includes an access point that serves wireless communication for the wireless client devices; calculate a conservativeness scaling factor for a first wireless client device in the basic service set based on the configuration parameters; determine a new guard interval of an orthogonal frequency division multiplexed symbol for the first wireless client device based on the conservativeness scaling factor; and replace an old guard interval for the first wireless client device with the new guard interval.

In yet another aspect, one or more non-transitory computer-readable storage media are provided. The one or more non-transitory computer-readable storage media are encoded with software comprising computer executable instructions which, when executed by a processor, cause the processor to: obtain configuration parameters of wireless client devices in a basic service set of a wireless local area network that includes an access point that serves wireless communication for the wireless client devices; calculate a conservativeness scaling factor for a first wireless client device in the basic service set based on the configuration parameters; determine a new guard interval of an orthogonal frequency division multiplexed symbol for the first wireless client device based on the conservativeness scaling factor; and replace an old guard interval for the first wireless client device with the new guard interval.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   obtaining configuration parameters of wireless client devices served by an access point in a basic service set of a wireless local area network;
   calculating a conservativeness scaling factor for a first wireless client device in the basic service set based on the configuration parameters;
   determining a new guard interval of an orthogonal frequency division multiplexed symbol for the first wireless client device based on the conservativeness scaling factor multiplied by a delay spread for the first wireless client device and a general scaling factor that is between two and four; and
   replacing an old guard interval for the first wireless client device with the new guard interval.

2. The method of claim 1, further comprising:
   calculating the conservativeness scaling factor based on one or more of whether:
   a frame transmission airtime fraction for the first wireless client device as a part of a total airtime used in the basic service set is less than a first threshold;
   a distance between the first wireless client device and the access point is greater than a second threshold;
   the first wireless client device is deployed in outdoors;
   a fraction of wireless client devices other than the first wireless client device using an extended range setting in the basic service set is equal to or greater than a third threshold;
   a fraction of the wireless client devices other than the first wireless client device using a guard interval more than 800 nano-seconds is equal to or greater than a fourth threshold; and
   a packet error rate for the first wireless client device is greater than a fifth threshold.

3. The method of claim 1, wherein determining the new guard interval for the first wireless client device includes:
   obtaining channel state information for the first wireless client device;
   computing the delay spread for the first wireless client device based on the channel state information; and
   determining the new guard interval for the first wireless client device based on the conservativeness scaling factor and the delay spread.

4. The method of claim 3, wherein determining the new guard interval for the first wireless client device further includes:
   computing a proposed guard interval based on the conservativeness scaling factor and the delay spread;
   comparing the proposed guard interval with a plurality of allowable guard intervals; and
   selecting an allowable guard interval that is closest to the proposed guard interval as the new guard interval for the first wireless client device.

5. The method of claim 1, further comprising:
   determining a wait time period for implementing the new guard interval; and
   after the wait time period lapses, replacing the old guard interval with the new guard interval.

6. The method of claim 1, further comprising:
   determining whether a transmission rate of the first wireless client device has been reduced to less than a predetermined rate;
   determining whether the old guard interval is a maximum allowable guard interval; and
   in response to determining that the transmission rate of the first wireless client device has been reduced to less than the predetermined rate and that the old guard interval is the maximum allowable guard interval, enabling an extended range mode for the first wireless client device.

7. The method of claim 6, further comprising:
   determining whether the first wireless client device is located more than a predetermined distance from the access point; and
   in response to determining that the first wireless client device is located more than the predetermined distance from the access point, enabling repetition of a high efficient-long training field (HE-LTF) in a preamble of a packet for the first wireless client device.

8. The method of claim 7, wherein determining whether the first wireless client device is located more than the predetermined distance from the access point includes:
   obtaining a signal-to-noise ratio (SNR) for the first wireless client device;
   obtaining a received signal strength indicator (RSSI) for the first wireless client device;
   determining whether a ratio of the SNR to the RSSI is less than a predetermined threshold; and
   in response to determining that a ratio of the SNR to the RSSI is less than the predetermined threshold, determining that the first wireless client device is located more than the predetermined distance from the access point.

9. An apparatus comprising:
   a network interface that enables network communications;
   a processor; and
   a memory to store data and instructions executable by the processor, wherein the processor is configured to execute the instructions to:
   obtain configuration parameters of wireless client devices in a basic service set of a wireless local area network that includes an access point that serves wireless communication for the wireless client devices;
   calculate a conservativeness scaling factor for a first wireless client device in the basic service set based on the configuration parameters;
   determine a new guard interval of an orthogonal frequency division multiplexed symbol for the first wireless client device based on the conservativeness scaling factor multiplied by a delay spread for the first wireless client device and a general scaling factor that is between two and four; and
   replace an old guard interval for the first wireless client device with the new guard interval.

10. The apparatus of claim 9, wherein the processor is configured to calculate the conservativeness scaling factor based on one or more of whether:
    a frame transmission airtime fraction for the first wireless client device as a part of a total airtime used in the basic service set is less than a first threshold;
    a distance between the first wireless client device and the access point is greater than a second threshold;
    the first wireless client device is deployed in outdoors;
    a fraction of wireless client devices other than the first wireless client device using an extended range setting in the basic service set is equal to or greater than a third threshold;
    a fraction of the wireless client devices other than the first wireless client device using a guard interval more than 800 nano-seconds is equal to or greater than a fourth threshold; and a packet error rate for the first wireless client device is greater than a fifth threshold.

11. The apparatus of claim 9, wherein the processor is configured to determine the new guard interval for the first wireless client device by:
   obtaining channel state information for the first wireless client device;
   computing the delay spread for the first wireless client device based on the channel state information; and
   determining the new guard interval for the first wireless client device based on the conservativeness scaling factor and the delay spread.

12. The apparatus of claim 11, wherein the processor is further configured to determine the new guard interval for the first wireless client device by:
   computing a proposed guard interval based on the conservativeness scaling factor and the delay spread;
   comparing the proposed guard interval with a plurality of allowable guard intervals; and
   selecting an allowable guard interval that is closest to the proposed guard interval as the new guard interval for the first wireless client device.

13. The apparatus of claim 9, wherein the processor is further configured to:
   determine a wait time period for implementing the new guard interval; and
   after the wait time period lapses, replace the old guard interval with the new guard interval.

14. The apparatus of claim 9, wherein the processor is further configured to:
   determine whether a transmission rate of the first wireless client device has been reduced to less than a predetermined rate;
   determine whether the old guard interval is a maximum allowable guard interval; and
   in response to determining that the transmission rate of the first wireless client device has been reduced to less than the predetermined rate and that the old guard interval is the maximum allowable guard interval, enable an extended range mode for the first wireless client device.

15. The apparatus of claim 14, wherein the processor is further configured to:
   determine whether the first wireless client device is located more than a predetermined distance from the access point; and
   in response to determining that the first wireless client device is located more than the predetermined distance from the access point, enable repetition of a high efficient-long training field (HE-LTF) in a preamble of a packet for the first wireless client device.

16. One or more non-transitory computer-readable storage media encoded with software comprising computer executable instructions which, when executed by a processor, cause the processor to:
   obtain configuration parameters of wireless client devices in a basic service set of a wireless local area network that includes an access point that serves wireless communication for the wireless client devices;
   calculate a conservativeness scaling factor for a first wireless client device in the basic service set based on the configuration parameters;
   determine a new guard interval of an orthogonal frequency division multiplexed symbol for the first wireless client device based on the conservativeness scaling factor multiplied by a delay spread for the first wireless client device and a general scaling factor that is between two and four; and
   replace an old guard interval for the first wireless client device with the new guard interval.

17. The one or more non-transitory computer-readable storage media of claim 16, wherein the instructions further causes the processor to calculate the conservativeness scaling factor based on one or more of whether:
   a frame transmission airtime fraction for the first wireless client device as a part of a total airtime used in the basic service set is less than a first threshold;
   a distance between the first wireless client device and the access point is greater than a second threshold;
   the first wireless client device is deployed in outdoors;
   a fraction of wireless client devices other than the first wireless client device using an extended range setting in the basic service set is equal to or greater than a third threshold;
   a fraction of the wireless client devices other than the first wireless client device using a guard interval more than 800 nano-seconds is equal to or greater than a fourth threshold; and
   a packet error rate for the first wireless client device is greater than a fifth threshold.

18. The one or more non-transitory computer-readable storage media of claim 16, wherein the instructions further causes the processor to determine the new guard interval for the first wireless client device by:
   obtaining channel state information for the first wireless client device;
   computing the delay spread for the first wireless client device based on the channel state information; and
   determining the new guard interval for the first wireless client device based on the conservativeness scaling factor and the delay spread.

19. The one or more non-transitory computer-readable storage media of claim 18, wherein the instructions further causes the processor to determine the new guard interval for the first wireless client device by:
   computing a proposed guard interval based on the conservativeness scaling factor and the delay spread;
   comparing the proposed guard interval with a plurality of allowable guard intervals; and
   selecting an allowable guard interval that is closest to the proposed guard interval as the new guard interval for the first wireless client device.

20. The one or more non-transitory computer-readable storage media of claim 16, wherein the instructions further causes the processor to:
   determine whether a transmission rate of the first wireless client device has been reduced to less than a predetermined rate;
   determine whether the old guard interval is a maximum allowable guard interval; and
   in response to determining that the transmission rate of the first wireless client device has been reduced to less than the predetermined rate and that the old guard interval is the maximum allowable guard interval, enable an extended range mode for the first wireless client device.

* * * * *